W. P. SPELLER.
Inkstands.
No. 204,388.  Patented May 28, 1878.
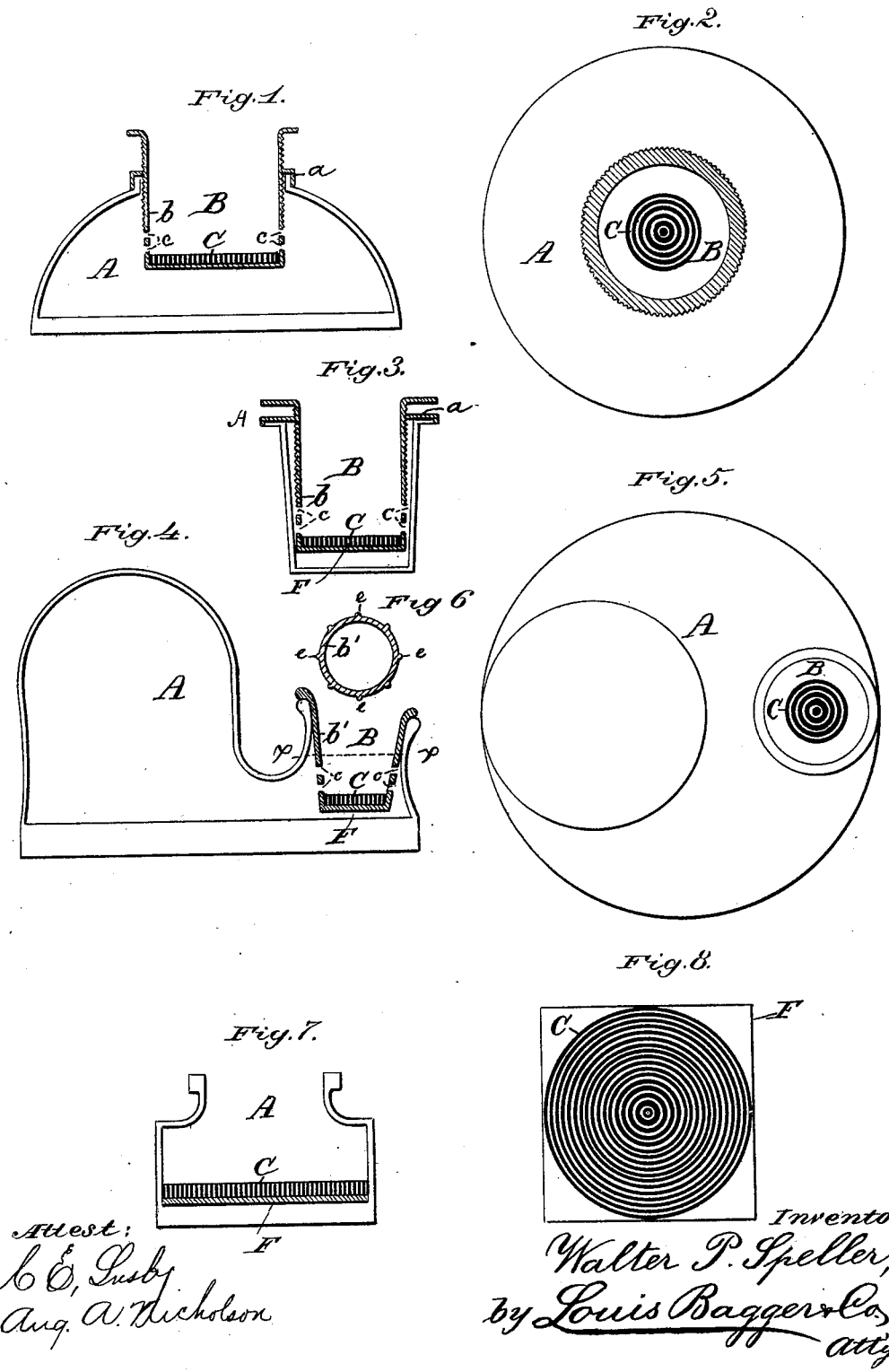

UNITED STATES PATENT OFFICE.

WALTER P. SPELLER, OF NEW YORK, N. Y.

IMPROVEMENT IN INKSTANDS.

Specification forming part of Letters Patent No. 204,388, dated May 28, 1878; application filed July 10, 1877.

*To all whom it may concern:*

Be it known that I, WALTER P. SPELLER, of the city of New York, county and State of New York, have invented certain new and useful Improvements in Inkstand Attachments; and I do hereby declare that the following is a full, clear, and exact description thereof, which will enable those skilled in the art to which it appertains to make and use the same, reference being had to the accompanying drawings, and the letters of reference marked thereon, which form a part of this specification.

My invention relates to a device to be attached to inkstands, bottles, and wells, &c., to serve as a combined pen-gage and pen-protector; and it consists in a cup-shaped guard made of soft rubber or other suitable material, either alone or in combination with other stiffer material, the construction of details and operation being as I shall now proceed more fully to describe.

In the drawings, Figure 1 is a vertical section of an inkstand having one form of my attachment. Fig. 2 is a top view of the same. Fig. 3 is a vertical section of my attachment applied to a well for school-desks. Fig. 4 shows my invention applied to a siphon inkstand. Fig. 5 is a top view of Fig. 4. Fig. 6 is a section on the line $x$ $x$, Fig. 4. Fig. 7 shows in section a traveling-inkstand having a part of my invention applied to it, and Fig. 8 is a top view of the rubber coil forming the pen-protector.

Similar letters of reference indicate corresponding parts in all the figures.

A is the inkstand, which may be of any suitable construction. B denotes my attachment, as a whole, for ordinary open ink stands or wells, Figs. 1 and 3. I prefer to construct this of metal, hard rubber, or other similar material, in the form a tube, $b$, screw-threaded, so as to fit in a screw-threaded cap or rim, $a$, with which the inkstand is provided. A bottom for the tube is formed by a coil, C, of soft rubber, and the sides of the tube have near the bottom perforations $c$ $c$, for the admission of ink. The tube may also, if desired, be provided with a lining of soft rubber. By adjusting the screw-threaded tube, the depth of ink in it may be easily regulated, and the rubber coil C forms a bottom, by striking which the most delicately-pointed pen cannot possibly be injured.

In siphon inkstands, Fig. 4, it is unnecessary to provide for the adjustment of the depth of ink. I therefore prefer to construct my attachment, when used for this class of inkstands, of soft rubber only, the bottom being formed of the soft-rubber coil C. The sides of the tube or cup $b'$ are preferably corrugated, as shown at $e$, to provide for the admission of air.

Traveling-inkstands, which are usually so low as to require no pen-gage, I simply provide with the rubber coil C, arranged in the bottom thereof, as shown in Fig. 7, to serve as a pen-protector.

The advantages of my invention will be readily understood from the foregoing decription and by reference to the drawings.

The rubber coil C, which is the principal element of my invention, makes it impossible for the pen to become injured by striking against the bottom, and the pen-gaging device, when used, prevents it from being dipped too deeply, thus making it liable to soil the the fingers of the person using it.

I am aware of the English Patent No. 580 of 1854, and I do not claim any of the various inkstand attachments shown therein; but,

Having thus described my invention, I claim and desire to secure by Letters Patent of the United States—

1. The combination, with an ink stand, bottle, or well, of a coil of soft rubber, arranged therein to form a pen-protector by providing a soft and pliable surface for the pen to strike against, substantially as described, for the purpose set forth.

2. The combination, with an inkstand having screw-threaded cap or rim $a$, of a screw-threaded tube, $b$, having perforations $c$, and a bottom formed of a coil of soft rubber, substantially as described, for the purpose set forth.

W. P. SPELLER.

Witnesses:
J. N. WING,
A. J. SMITH.